United States Patent

Fukaishi

[11] Patent Number: 5,963,362
[45] Date of Patent: Oct. 5, 1999

[54] MONITORING APPARATUS FOR OPTICAL FIBER AMPLIFIER

[75] Inventor: Kosuke Fukaishi, Tokyo, Japan

[73] Assignee: NEC Corporation, Tokyo, Japan

[21] Appl. No.: 09/004,334

[22] Filed: Jan. 8, 1998

[30] Foreign Application Priority Data

Jan. 16, 1997 [JP] Japan .................................. 9-017807

[51] Int. Cl.[6] .............................. H01S 3/00; H01S 3/131; G02B 6/26
[52] U.S. Cl. ........................ 359/341; 359/137; 359/337
[58] Field of Search ................................ 359/110, 137, 359/44, 177, 341, 387

[56] References Cited

U.S. PATENT DOCUMENTS

| | | | |
|---|---|---|---|
| 5,317,660 | 5/1994 | Veith | 385/24 |
| 5,506,724 | 4/1996 | Shimizu et al. | 359/341 |
| 5,521,751 | 5/1996 | Aide et al. | 359/337 |
| 5,633,749 | 5/1997 | Shibuya | 359/341 |
| 5,680,246 | 10/1997 | Takahashi et al. | 359/341 |

FOREIGN PATENT DOCUMENTS

| | | |
|---|---|---|
| 2094867 | 11/1993 | Canada . |
| 6050841 | 2/1994 | Japan . |

*Primary Examiner*—Nelson Moskowitz
*Attorney, Agent, or Firm*—Whitham, Curtis & Whitham

[57] ABSTRACT

A monitoring apparatus for an optical fiber amplifier includes a branch member, an optical filter, a light-receiving element, and a detector. The branch member branches reflected light obtained by reflecting, by an output portion, output light from an optical fiber amplifier for directly amplifying an optical signal. The optical filter removes a signal wavelength component from the reflected light branched by the branch member. The light-receiving element receives the reflected light output from the optical filter from which the signal wavelength component is removed. The detector outputs a detection signal representing an abnormality on a transmission path when the output level of the light-receiving element is a predetermined level or higher.

11 Claims, 3 Drawing Sheets

MONITORING APPARATUS FOR OPTICAL FIBER AMPLIFIER

BACKGROUND OF THE INVENTION

The present invention relates to a monitoring apparatus for an optical fiber amplifier for amplifying an optical signal in a communication system using an optical fiber transmission path.

In a communication system using an optical fiber transmission path, as an optical amplifier for directly amplifying a transmitting optical signal, an optical fiber amplifier having an arrangement shown in FIG. 3 is known. In FIG. 3, reference numerals 1 and 11 denote optical connectors; 2, an optical multiplexer for multiplexing excited light from an excitation light source 3 with light incident via the optical connector 1; 4 and 6, optical isolators; 5, an erbium-doped optical fiber for amplifying the light incident via the optical isolator 4; 7, an optical passive component connected to the output side of the erbium-doped optical fiber 5 via the optical isolator 6 to branch reflected light; 9, a light-receiving element for receiving the light branched by the optical passive component 7; and 12, an optical fiber transmission path on the output side connected to the optical connector 11.

In the conventional optical fiber amplifier having this arrangement, an optical signal incident from an optical fiber transmission path (not shown) on the input side via the optical connector 1 is multiplexed by the optical multiplexer 2 with excited light output from the excitation light source 3, and then incident on the erbium-doped optical fiber 5 via the optical isolator 4. The optical signal amplified by the erbium-doped optical fiber 5 emerges to the optical fiber transmission path 12 via the optical isolator 6, the optical passive component 7, and the optical connector 11. At this time, reflected light from the output side is branched by the optical passive component 7 to be incident on the light-receiving element 9. The optical passive component 7 and the light-receiving element 9 constitute a reflection monitoring circuit 20 for monitoring the reflected light amount from the output side to detect an abnormality on the transmission path.

In this arrangement, if the optical connector 11 at the output portion is disconnected from the erbium-doped optical fiber 5, part of light output from the optical fiber amplifier is Fresnel-reflected by the end face of the optical connector 11. Then, the reflected light is branched by the passive component 7 to be incident on the light-receiving element 9. When the optical connector 11 is kept connected to the optical fiber transmission path 12, the reflected light amount of light output from the optical fiber amplifier on the end face of the connector is small, so that the power of the reflected light incident on the light-receiving element 9 is small. When the optical connector 11 is disconnected from the optical fiber transmission path 12, the reflected light amount of light output from the optical fiber amplifier on the end face of the optical connector 11 becomes large to increase the power of the reflected light incident on the light-receiving element 9. When the power of the reflected light incident on the light-receiving element 9 reaches a predetermined level or higher, the reflection monitoring circuit 20 detects the disconnection of the optical connector 11. Also when the transmission path after the optical passive component 7 fractures, the power of the reflected light incident on the light-receiving element 9 increases, and the reflection monitoring circuit 20 detects the fracture of the transmission path.

In the conventional reflection monitoring circuit 20, when light having power exceeding a certain threshold is incident on the optical fiber transmission path 12, stimulated Brillouin scattering (SBS) occurs in the optical fiber transmission path 12, and the back-scattering light enters the light-receiving element 9 via the passive component 7. As a result, the power of the light incident on the light-receiving element 9 increases. Even if the optical connector 11 is normally connected to the optical fiber transmission path 12, the reflection monitoring circuit 20 erroneously detects that the optical connector 11 is disconnected.

SUMMARY OF THE INVENTION

It is an object of the present invention to provide a reflection monitoring circuit for an optical fiber amplifier in which a detection error caused by back-scattering light of SBS occurring in an optical fiber transmission path on the output side is prevented.

In order to achieve the above object, according to the present invention, there is provided a monitoring apparatus for an optical fiber amplifier comprising branch means for branching reflected light obtained by reflecting, by an output portion, output light from an optical fiber amplifier for directly amplifying an optical signal, optical filter means for removing a signal wavelength component from the reflected light branched by the branch means, light-receiving means for receiving the reflected light output from the optical filter means from which the signal wavelength component is removed, and detection means for outputting a detection signal representing an abnormality on a transmission path when an output level of the light-receiving means is not less than a predetermined level.

DESCRIPTION OF THE PREFERRED EMBODIMENT

The present invention will be described in detail below with reference to the accompanying drawings.

Figure 1:
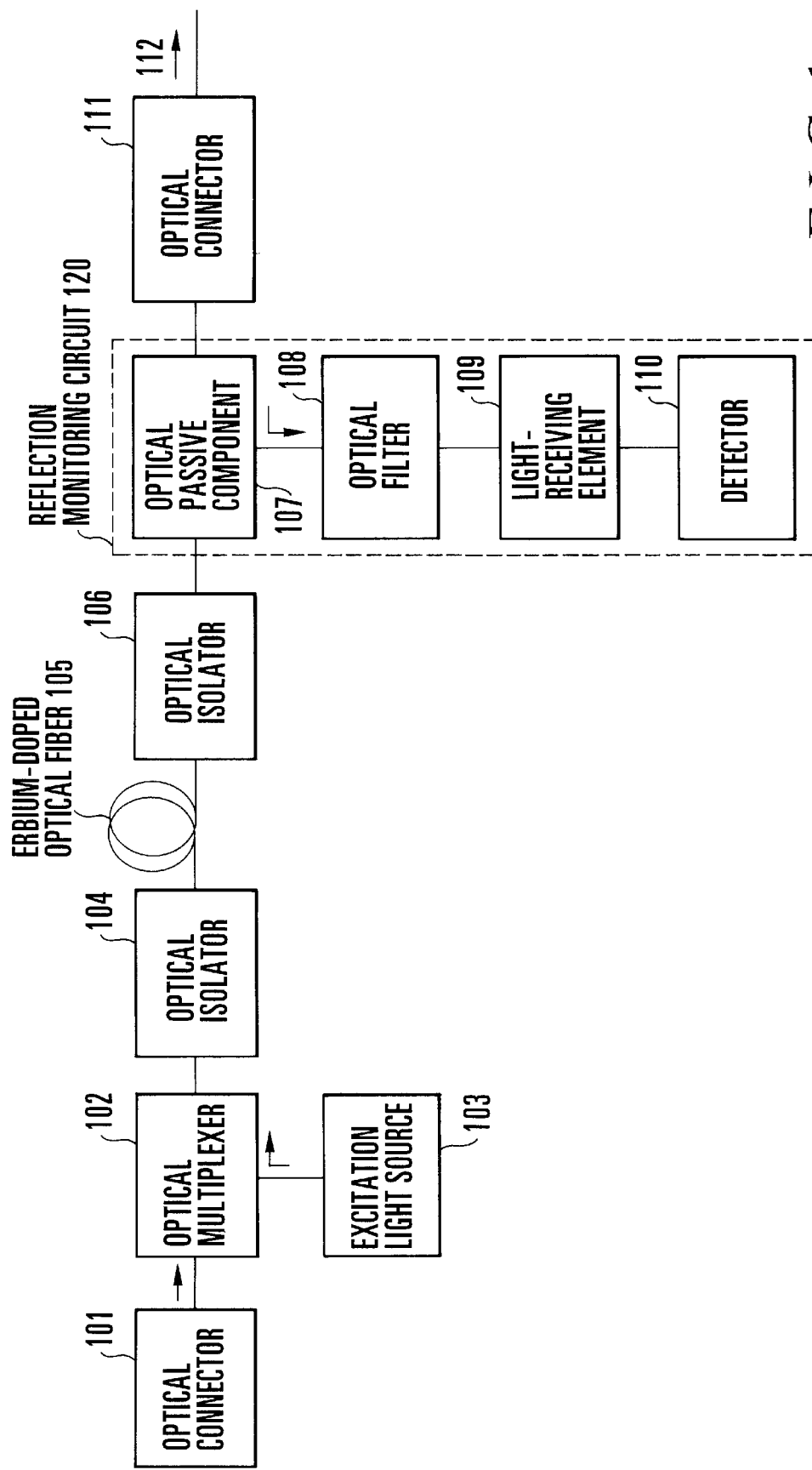
FIG. 1 is a block diagram of a reflection monitoring circuit of an optical fiber amplifier according to an embodiment of the present invention.

FIG. 1 shows an optical fiber amplifier according to an embodiment of the present invention. In FIG. 1, reference numeral 101 denotes an optical connector connected to an optical fiber transmission path (not shown) on the input side; 102, an optical multiplexer for multiplexing excited light from an excitation light source 103 with light incident via the optical connector 101; 105, an erbium-doped optical fiber for amplifying the incident light; 104 and 106, polarization independent optical isolators respectively connected to the input and output sides of the erbium-doped optical fiber 105 to prevent laser oscillation caused by reflected return light; 111, an optical connector connected to an optical fiber transmission path 112 on the output side; and 120, a reflection monitoring circuit connected between the optical isolator 106 and the optical connector 111.

The reflection monitoring circuit 120 is constituted by an optical passive component 107 connected to the output side of the erbium-doped optical fiber 105 via the optical isolator 106 to branch light reflected by the end face of the optical connector 111, an optical filter 108 made up of a dielectric film or a fiber grating for preventing transmission of a main signal wavelength component contained in the reflected light branched by the optical passive component 107, a light-receiving element 109 for receiving an optical output from the optical filter 108, and a detector 110 for monitoring the output level of the light-receiving element 109 to detect an abnormality on the transmission path.

The operation of the optical fiber amplifier having this arrangement will be described.

An optical signal incident from the optical fiber transmission path on the input side via the optical connector 101 is multiplexed by the optical multiplexer 102 with excited light output from the excitation light source 103, and then incident on erbium-doped optical fiber 105 via the optical isolator 104. The optical signal amplified by the erbium-doped optical fiber 105 emerges to the optical fiber transmission path 112 on the output side via the optical isolator 106, the optical passive component 107, and the optical connector 111.

Part of the output light from the optical fiber amplifier is reflected by the end face of the optical connector 111. The reflected light is branched by the optical passive component 107 to be incident on the optical filter 108. The optical filter 108 prevents transmission of a main signal wavelength component contained in the reflected light input. That is, only amplified spontaneous emission (ASE) generated by the optical fiber amplifier is transmitted through the optical filter 108 and received by the light-receiving element 109.

At this time, when the optical connector 111 is connected to the optical fiber transmission path 112, the power of the reflected light of ASE which is reflected on the output side and incident on the light-receiving element 109 is small. To the contrary, when the optical connector 111 is disconnected from the optical fiber transmission path 112, or the optical fiber transmission path 112 on the output side fractures, the power of the reflected light of ASE incident on the light-receiving element 109 becomes large. The detector 110 monitors the output level of the light-receiving element 109, and outputs a detection signal representing an abnormality on the transmission path when the output level is a predetermined level or higher. That is, upon detecting that the power of the reflected light of ASE incident on the light-receiving element 109 exceeds the predetermined level, the reflection monitoring circuit 120 detects the disconnection of the optical connector 111 or the fracture of the optical fiber transmission path 112 on the output side.

The reflection monitoring circuit 120 of the optical fiber amplifier receives only the reflected light of ASE output from the optical fiber amplifier, and detects the connection state of the optical connector 111 on the output side from the power of the reflected light. For this reason, the reflection monitoring circuit 120 does not erroneously detect disconnection of the optical connector 111 owing to back-scattering light of SBS when the optical connector 111 on the output side is connected.

Figure 2:
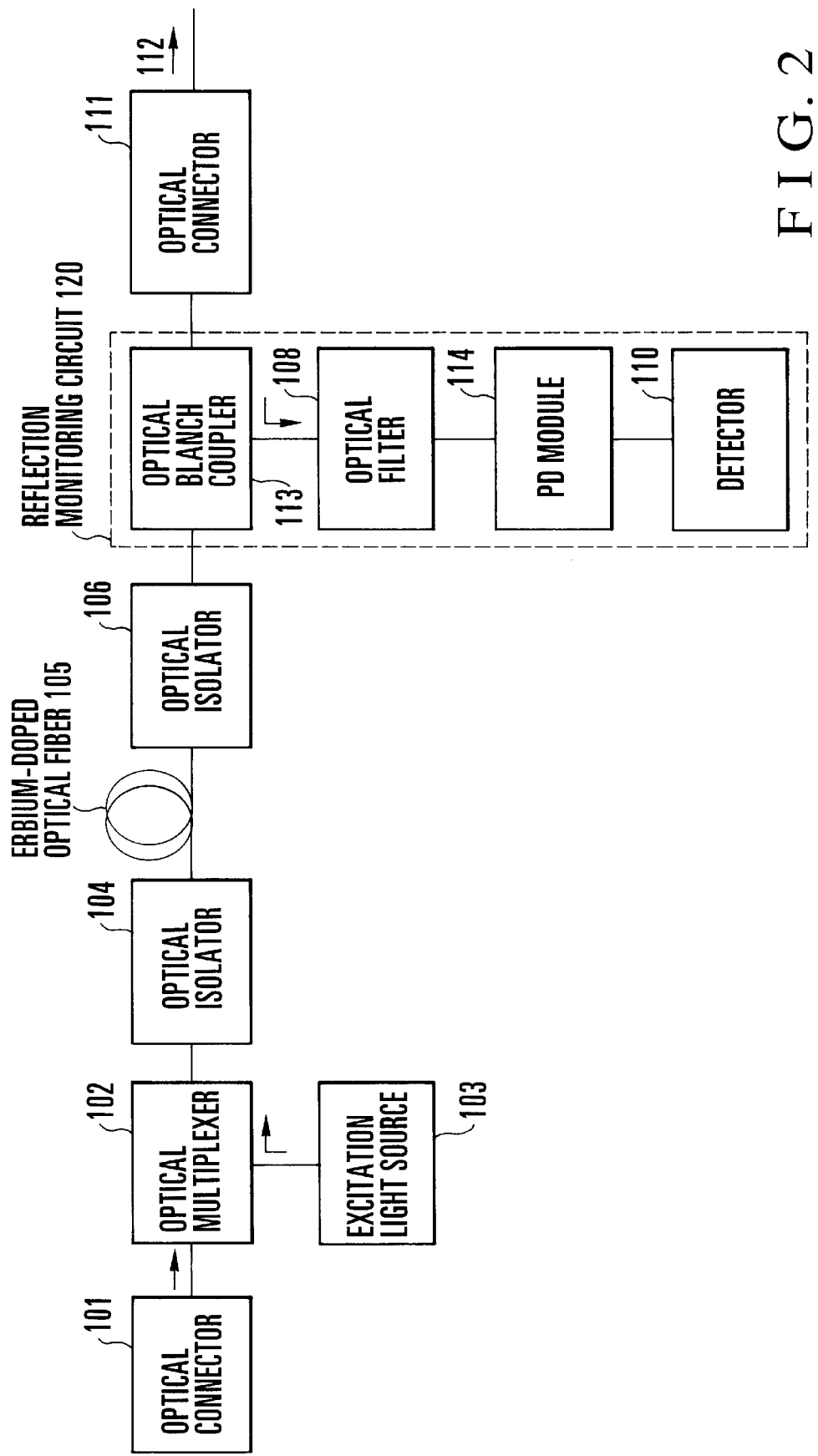
FIG. 2 is a block diagram showing a detailed example of the optical fiber amplifier in FIG. 1.

FIG. 2 shows a detailed example of the optical fiber amplifier in FIG. 1 and particularly the reflection monitoring circuit 120. In FIG. 2, an optical branch coupler 113 is used as the optical passive component 107, and a photodiode (PD) module 114 is as the light-receiving element 109.

Figure 3:
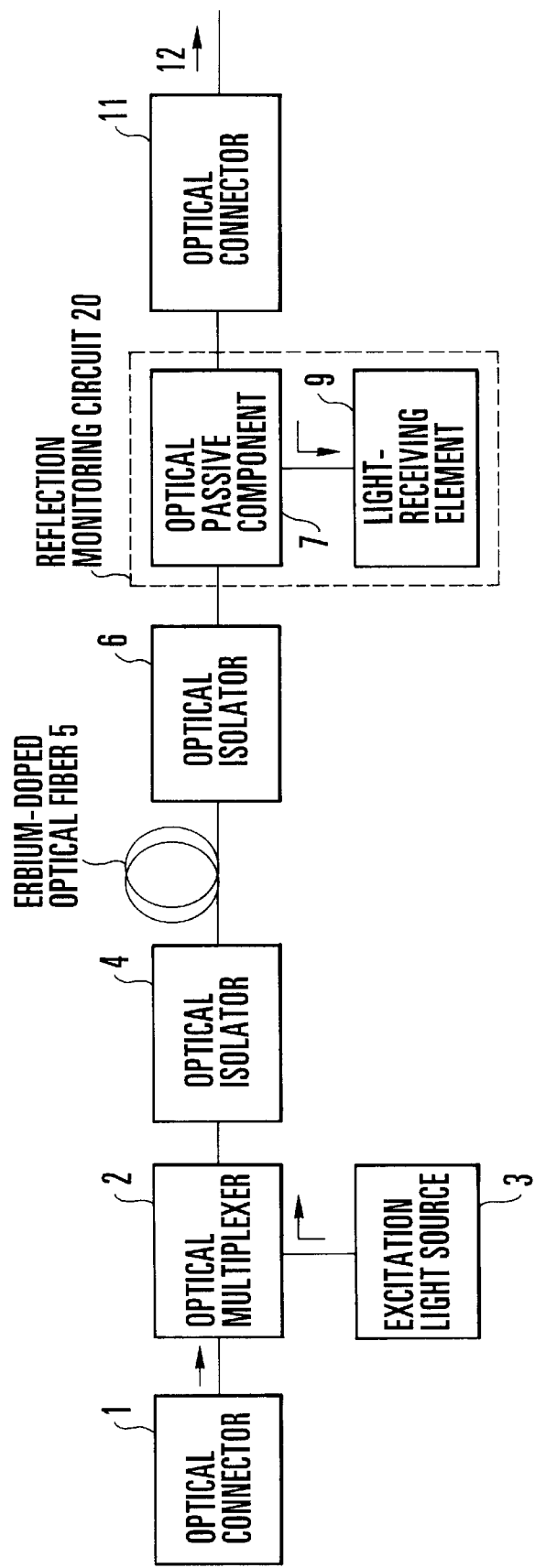
FIG. 3 is a block diagram showing a conventional optical fiber amplifier.

In the arrangement of the conventional optical fiber amplifier shown in FIG. 3, even if the optical connector 11 on the output side is connected to the optical fiber transmission path 12, the reflection monitoring circuit 20 erroneously detects disconnection of the optical connector due to back-scattering light of SBS for an output light intensity of +17 dBm. At this time, the level of ASE is −27 dBm. In this embodiment, by inserting the optical filter 108 for cutting the main signal wavelength component by 45 dB, erroneous detection of the reflection monitoring circuit 120 is eliminated.

Although the optical branch coupler 113 is used as the optical passive component in the detailed example, an optical circulator may be used. Instead of using the optical fiber amplifier 105 as the optical fiber amplifier, a semiconductor laser amplifier may be used.

As has been described above, according to the present invention, the reflection monitoring circuit comprises the optical filter for removing the main signal wavelength component from reflected light. A detection error caused by back-scattering light of stimulated Brillouin scattering (SBS) occurring when signal light having power exceeding a given threshold is incident on the optical fiber transmission path can be eliminated. A reflection monitoring circuit with high reliability can be constituted.

What is claimed is:

1. A monitoring apparatus for an optical fiber amplifier for detecting an error caused by back scattering light of stimulated Brillouin scattering, the monitoring apparatus comprising:

branch means for branching reflected light obtained by reflecting, by an output portion, output light from an optical fiber amplifier for directly amplifying an optical signal;

optical filter means for removing a signal wavelength component from the reflected light branched by said branch means;

light-receiving means for receiving the reflected light output from said optical filter means from which the signal wavelength component is removed; and detection means for monitoring an output level of said light-receiving means and outputting a detection signal representing an abnormality on a transmission path when the output level of said light-receiving means is higher than a predetermined level, wherein said abnormality is indicated by back scattering light of stimulated Brillouin scattering.

2. An apparatus according to claim 1, wherein said output portion is an optical connector connected to an optical fiber transmission path on an output side, and said branch means is connected between an output side of said optical fiber amplifier and said optical connector to branch light reflected by an end face of said optical connector to said optical filter means.

3. An apparatus according to claim 1, wherein said branch means comprises one of an optical branch coupler and an optical circulator.

4. An apparatus according to claim 1, wherein said optical filter means is an optical filter made up of one of a dielectric film and a fiber grating.

5. An apparatus according to claim 1, wherein said optical fiber amplifier comprises one of an optical fiber amplifier and a semiconductor laser amplifier.

6. An apparatus according to claim 1, wherein:

said detection means detects whether the output level of the reflected light of amplified spontaneous emission incident on said light-receiving means is higher than the predetermined level, and said detection means detects a disconnection of an optical connector or fracture of an optical fiber transmission path on an output side of the transmission line when said detected amplified spontaneous emission incident on said light-receiving means is higher than the predetermined level.

7. An apparatus according to claim 1, wherein said branch means, said optical filter means, said light-receiving means and said detection means receives only reflected light of amplified spontaneous emission output from the optical fiber amplifier, and said detection means detects whether a connection state of an optical connector on an output side of the transmission is connected.

8. A reflection monitoring apparatus for an optical fiber amplifier, the optical fiber amplifier including at least optical isolators placed on respective sides of an optical fiber for preventing laser oscillation caused by reflected return light and an optical connector connected to an optical fiber transmission path on an output side, the reflection monitoring apparatus being connected to an input side of the optical connector and comprising:

an optical passive component, said optical passive component branching light reflected by an end face of the optical connector;

an optical filter, said optical filter preventing transmission of a main signal wavelength component from the reflected light branched by said optical passive component so that only amplified spontaneous emission generated from the optical fiber amplifier is transmitted through said optical filter;

a light-receiving element, said light-receiving element receiving the reflected amplified spontaneous emission output from said optical filter; and a detector monitoring an output level of said light-receiving element to detect an abnormality on a transmission path when the output level of said light-receiving element is higher than a predetermined level.

9. An apparatus according to claim 8, wherein said detector detects a disconnection of the optical connector or fracture of the fiber transmission path on the output side of the transmission line when the detected amplified spontaneous emission incident on said light-receiving element is higher than the predetermined level.

10. An apparatus according to claim 8, wherein said detector detects whether a connection state of the optical connector on the output side of the transmission is connected.

11. A method for monitoring an optical fiber amplifier comprising:

branching light reflected by an end face of the optical connector;

preventing transmission of a main signal wavelength component from the reflected light being branched so that only amplified spontaneous emission generated from the optical fiber amplifier is transmitted;

receiving the reflected amplified spontaneous emission by a light receiving element;

monitoring an output level of the light-receiving element to detect an abnormality on a transmission path when the output level of the light-receiving element is higher than a predetermined level; and detecting a disconnection of an optical connector or fracture of the fiber transmission path on the output side of the transmission line when the detected amplified spontaneous emission incident on said light-receiving element is higher than the predetermined level.

* * * * *